A. W. McCLURE.
Churn-Dasher.

No. 211,246.                    Patented Jan. 7, 1879.

WITNESSES
F. L. Ourand
John G. Center

INVENTOR
Alice W. McClure
by Alex Mahon
ATTORNEY

UNITED STATES PATENT OFFICE.

ALICE W. McCLURE, OF ST. LOUIS, MISSOURI.

IMPROVEMENT IN CHURN-DASHERS.

Specification forming part of Letters Patent No. 211,246, dated January 7, 1879; application filed December 27, 1877.

*To all whom it may concern:*

Be it known that I, ALICE W. McCLURE, of the city and county of St. Louis, State of Missouri, have invented certain new and useful Improvements in Churn-Dashers, of which the following is a full, clear, and exact description, reference being had to the accompanying drawing, making part of this specification, in which—

Figure 1:
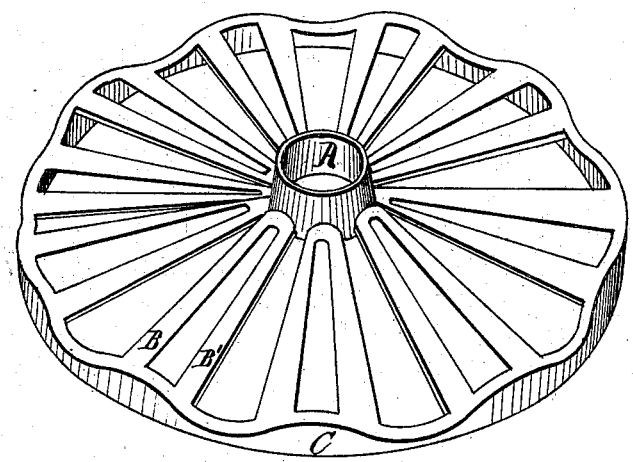
Figure 2:
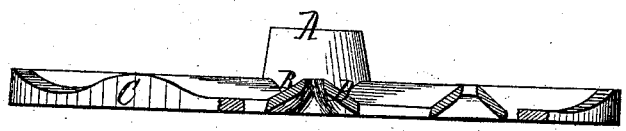

Figure 1 is a perspective view of my improved churn-dasher; and Fig. 2 is a side elevation, partly in section, showing the form and arrangement of the radial arms.

Similar letters of reference denote corresponding parts in both figures.

My invention consists in a novel arrangement of oblique, radial, and diverging arms in connection with a central hub or sleeve and an encircling-rim, the arms being set alternately, inclining in opposite directions, and provided with sharpened or cutting edges, substantially as and for the purposes hereinafter described.

In the accompanying drawing, A represents the central hub or sleeve, adapted to receive the rod or handle, and B B' are the arms radiating therefrom. These arms expand in width as they recede from the hub, so that the respective edges thereof follow each a radial line, or one nearly so, leaving spaces having correspondingly diverging lines between them. They are set alternately inclining in opposite directions, in such manner as to present openings between the arms, alternately wider at top and bottom, in the form of elongated and tapering funnels extending from the hub A to the encircling-rim C, and arranged to alternate, the one having its mouth at the top, its two sides forming each one wall to the two adjacent funnels, having inverted mouths or openings from below.

It will be seen that by this arrangement the bulk or larger part of the cream operated upon will pass upward through one set of funnels in the dasher as the latter is forced downward, and downward through another alternating set as the dasher is drawn upward.

The alternately opposite inclination of the slats or arms prevent any tendency of the dasher to rotate from the action of the cream thereon, while by forcing the cream to pass back and forth upon opposite sides over inclined planes an effective agitation of the cream is produced. Again, the divergence of the arms causes the bulk or larger portion of the cream and the butter as it forms to move away from the central hub toward the rim C, where the openings between the slats or arms are widest and the cream can more readily escape, this action of the dasher tending to produce a vacuum at the center, which is rapidly filled by the inflowing cream. By this latter action the butter, as it begins to assume form, will be permitted to remain near the rim, and to move back and forth through the larger portions of the spaces between the slats, while the thinner and more liquid contents of the churn will flow toward the center and fill the place of that displaced by the dasher, thereby obviating to a large degree the danger of breaking or crushing the oil-sacks or globules of butter.

The edges of the slats or arms B B', instead of being formed at right angles to the side, are beveled or brought to a cutting or sharpened edge, thus facilitating the displacement of the cream and the passage of the dasher through it in the manner that has been explained.

I am aware that churn-dashers have been made having parallel slats set alternately inclining in opposite directions; but I am not aware that such slats have ever been arranged radially to the hub or central sleeve, and made to diverge thence outwardly, giving the increased spaces between them above described.

One advantage of this latter construction of the dasher, in addition to those above described, is the facility with which it may be cleaned, from the fact that the arms and cutting-edges all radiate outward, and permit the butter to readily slip outward until it escapes through the larger openings between them. Another advantage is that the dasher in the form described may, if desired, be cast in a single piece. It may be made to run as lightly as desired by giving increased space between the radial arms.

Having now described my invention, what I claim as new, and desire to secure by Letters Patent, is—

1. The within-described improved churn-dasher, consisting of the hub A, adapted to receive the handle, and the oblique diverging arms B B′, radiating from the hub to the band or rim C, and alternately inclining in opposite directions, all substantially as described.

2. The diverging radial slats or arms B B′, set alternately inclining in opposite directions and provided with the sharpened or cutting edges, substantially as and for the purpose described.

ALICE W. McCLURE.

Witnesses:
JOHN F. ALBRIGHT,
VIRGINIA DAVIS.